United States Patent
Endo et al.

(10) Patent No.: US 10,495,771 B2
(45) Date of Patent: Dec. 3, 2019

(54) METHOD AND SYSTEM FOR PROCESSING DIPOLE ANISOTROPY

(71) Applicant: Schlumberger Technology Corporation, Sugar Land, TX (US)

(72) Inventors: Takeshi Endo, Sagamihara (JP); Henri-Pierre Valero, Clamart (FR); Denis Syresin, Sagamihara (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 72 days.

(21) Appl. No.: 15/333,199

(22) Filed: Oct. 25, 2016

(65) Prior Publication Data

US 2017/0115421 A1    Apr. 27, 2017

Related U.S. Application Data

(60) Provisional application No. 62/247,186, filed on Oct. 27, 2015.

(51) Int. Cl.
| | |
|---|---|
| *G01V 1/50* | (2006.01) |
| *G01V 1/28* | (2006.01) |
| *G01V 1/24* | (2006.01) |
| *G01V 1/30* | (2006.01) |

(52) U.S. Cl.
CPC ............... *G01V 1/50* (2013.01); *G01V 1/284* (2013.01); *G01V 1/303* (2013.01); *G01V 1/24* (2013.01); *G01V 2200/16* (2013.01); *G01V 2210/626* (2013.01); *G01V 2210/6222* (2013.01)

(58) Field of Classification Search
CPC ........... G01V 1/50; G01V 1/284; G01V 1/303
USPC ..................... 702/9, 2, 11; 367/75
See application file for complete search history.

(56) References Cited

U.S. PATENT DOCUMENTS

| | | | |
|---|---|---|---|
| 2005/0000688 A1* | 1/2005 | Hsu ........................ | G01V 1/284 166/254.2 |
| 2006/0235618 A1* | 10/2006 | Wu .......................... | G01V 1/46 702/6 |
| 2007/0030761 A1* | 2/2007 | Donald .................. | G01V 1/284 367/75 |
| 2007/0268782 A1* | 11/2007 | Pabon ...................... | G01V 1/50 367/31 |

(Continued)

OTHER PUBLICATIONS

X. Zeng. and C. Macbeth, "Algebraic Processing Technique for Estimating Shear-Wave Splitting in Near-Offset VSP Data : Theory", Geophysical Prospecting, 41(8), pp. 1033-1066, Nov. 1993.

(Continued)

*Primary Examiner* — Eman A Alkafawi

(57) ABSTRACT

A method for processing sonic data measured with a downhole tool is provided. The method comprises acquiring dipole wave data measured by a dipole acquisition in multiple firing, and estimating at least one of formation anisotropy properties based on the multiple firing dipole data. The at least one of formation anisotropy properties may be derived by Alford rotation processing. The method may further comprise processing with inversion of an orthogonality error angle of the firing data in two dipole firings and/or providing a quality control with the estimating result based on sonic measurements in a pump-off period.

19 Claims, 20 Drawing Sheets

(56) References Cited

U.S. PATENT DOCUMENTS

2013/0064039 A1* 3/2013 Pabon .................... G01V 1/46
367/25
2015/0263435 A1* 9/2015 Song .................... H01Q 21/062
343/810

OTHER PUBLICATIONS

B. Nolte and A. C. H. Cheng, "Estimation of Nonorthogonal Shear Wave Polarizations and Shear Wave Velocities From Four-Component Dipole Logs", 1996, ERL Industry Consortia Technical Reports.

S. Bose, "Performance bounds on shear anisotropy azimuth estimation using borehole sonic logging tools", Sensor Array and Multichannel Signal Processing Workshop Proceedings, 2002.

Alford, R. M., "Shear Data in the Presence of Azimuthal Anisotropy: Dilley, Texas", Expanded Abstracts, 56th SEG Annual International Meeting and Exposition, Houston, Texas, USA, Nov. 2-6, 1986, pp. 476-479.

* cited by examiner

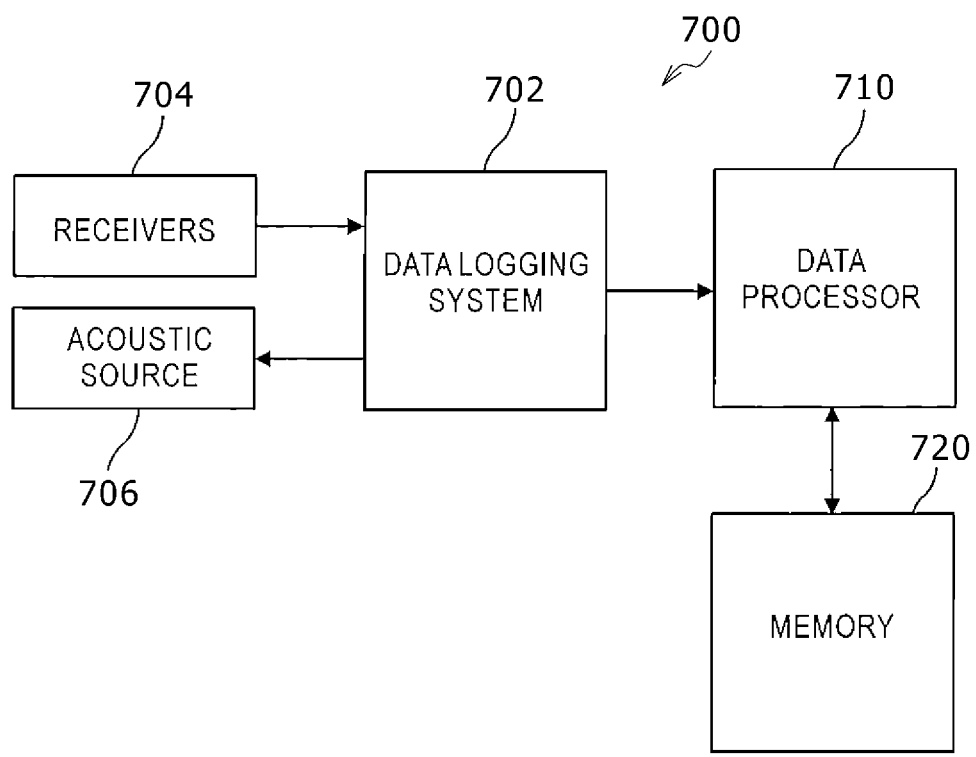
F I G . 6

F I G . 7
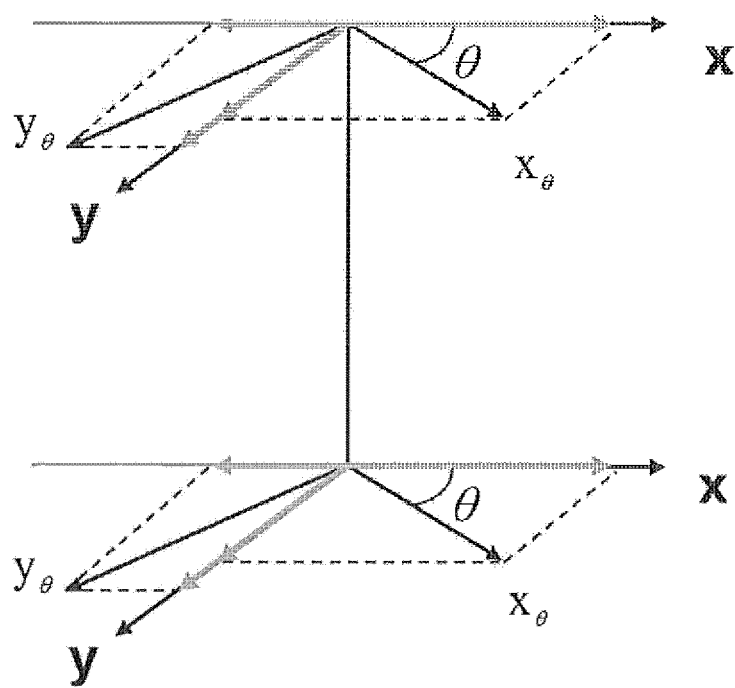

$$XX' = XX$$
$$XY' = XY$$
$$YX = (YY - XX)\tan\gamma + YX$$
$$YY = YY - (XY + YX)\tan\gamma$$

↓

1D Alford rotation for θ

↓

MinEn(θ, γ), MaxEn

XX and YY waveforms before applying

XX and YY waveforms before applying

METHOD AND SYSTEM FOR PROCESSING DIPOLE ANISOTROPY

CROSS-REFERENCE TO RELATED APPLICATIONS

This application is based upon and claims the benefit of the priority of U.S. Provisional Application Ser. No. 62/247,186 entitled "METHOD FOR PROCESSING DIPOLE ANISOTROPY" filed on Oct. 27, 2015, the disclosure of which is incorporated herein in its entirety by reference thereto.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to methods and systems method and system for processing sonic data measured with a downhole tool. In particular, the present disclosure relates to methods and systems for estimating anisotropic properties of formation from acoustic data measured with a downhole tool such as a LWD (logging-while-drilling), MWD (measurements while drilling) tool or wireline logging tool.

In drilling or logging applications, acoustic measurements can be used to measure characteristics of the surrounding formation. Acoustic measurement techniques generally involve sensing acoustic waves generated by one or more acoustic sources and that have propagated through a geological formation. A geological formation whose rock properties are the same in all directions is an "isotropic" formation. A physically more precise description is "anisotropy", i.e., a predictable variation of a physical property of a material with the direction in which it is measured. This "anisotropic" formation is a geological formation with directionally dependent properties and commonly caused by anisotropy of the constituting crystals, alignment of oblate particles, fine-scale layering or aligned and quasi-aligned fractures.

Several techniques for estimating the anisotropic properties of formation using sonic data are conventionally known, for example, as described in the documents of: X. Zeng. and C. Macbeth, "ALGEBRAIC PROCESSING TECHNIQUE FOR ESTIMATING SHEAR-WAVE SPLITTING IN NEAR-OFFSET VSP DATA: THEORY", Geophysical Prospecting, 41(8), pp. 1033-1066, November 1993; B. Nolte and A. C. H. Cheng., ESTIMATION OF NONORTHOGONAL SHEAR WAVE POLARIZATIONS AND SHEAR WAVE VELOCITIES FROM FOUR-COMPONENT DIPOLE LOGS", 1996, ERL Industry Consortia Technical Reports; and S. Bose, "Performance bounds on shear anisotropy azimuth estimation using borehole sonic logging tools", Sensor Array and Multichannel Signal Processing Workshop Proceedings, 2002, the contents of which are incorporated herein in their entirety by reference thereto.

In such technique, for example, a numerical rotation method of Alford is used for estimating anisotropic properties of formation. This method is commonly referred to "Alford rotation" and a processing technique to project formation shear data measured in any two orthogonal directions into the fast and slow shear directions in the presence of shear-wave anisotropy, as described in the document of Alford, R. M., "Shear Data in the Presence of Azimuthal Anisotropy: Dilley, Tex.", Expanded Abstracts, 56th SEG Annual International Meeting and Exposition, Houston, Tex., USA, Nov. 2-6, 1986, pp. 476-479, the content of which is incorporated herein in its entirety by reference thereto.

There is a need, however, for improving the technique for estimating the anisotropic properties of formation using sonic data.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosure, a method for processing sonic data measured with a downhole tool comprises acquiring dipole wave data measured by a dipole acquisition in multiple firing, and estimating at least one of formation anisotropy properties based on the multiple firing dipole data. In the method of the disclosure, the at least one of formation anisotropy properties may be derived by Alford rotation processing, the dipole acquisition may comprise at least one of a cross dipole acquisition and a single dipole acquisition, and the formation anisotropic properties may comprise at least one of a fast shear direction, a fast shear slowness and a slow shear slowness.

The method of the disclosure may further comprise processing with inversion of an orthogonality error angle of the firing data in two dipole firings. The method may further comprise providing a quality control with the estimating result based on sonic measurements in a pump-off period. In some embodiments of the disclosure, the multiple firing dipole data may be measured by a LWD (logging-while-drilling) tool in a borehole while drilling. The multiple firing dipole data may be wireline cross dipole data measured by a wireline logging tool in a borehole.

In another aspect of the present disclosure, a system for processing sonic data measured with a downhole tool comprises a memory to record the sonic data and the processor. The processor is used to acquire dipole wave data measured by a dipole acquisition in multiple firing, and estimate at least one of formation anisotropy properties based on the multiple firing dipole data. In the system of the disclosure, the at least one of formation anisotropy properties may be derived by Alford rotation processing, the dipole acquisition may comprise at least one of a cross dipole acquisition and a single dipole acquisition, and the formation anisotropic properties may comprise at least one of a fast shear direction, a fast shear slowness and a slow shear slowness.

The processor may be further used to process with inversion of an orthogonality error angle of the firing data in two dipole firings. The processor may be further used to provide a quality control with the estimating result based on sonic measurements in a pump-off period. In some embodiments of the disclosure, the multiple firing dipole data may be measured by a LWD (logging-while-drilling) tool in a borehole while drilling. The multiple firing dipole data may be wireline cross dipole data measured by a wireline logging tool in a borehole.

In yet another aspect of the present disclosure, a tangible article of manufacture stores machine readable instructions which, when executed, cause a machine to at least acquire dipole wave data measured by a dipole acquisition in multiple firing, and estimate at least one of formation anisotropy properties based on the multiple firing dipole data. In the tangible article of manufacture of the disclosure, the at least one of formation anisotropy properties may be derived by Alford rotation processing, the dipole acquisition may comprise at least one of a cross dipole acquisition and a single dipole acquisition, and the formation anisotropic properties may comprise at least one of a fast shear direction, a fast shear slowness and a slow shear slowness.

The machine readable instructions, when executed, may further cause the machine to process with inversion of an orthogonality error angle of the firing data in two dipole firings. The machine readable instructions, when executed, may further cause the machine to provide a quality control with the estimating result based on sonic measurements in a pump-off period. In some embodiments of the disclosure, the multiple firing dipole data may be measured by a LWD (logging-while-drilling) tool in a borehole while drilling. The multiple firing dipole data may be wireline cross dipole data measured by a wireline logging tool in a borehole.

Advantages and novel features of the disclosures will be set forth in the description which follows or may be learned by those skilled in the art through reading the materials herein.

BRIEF DESCRIPTION OF THE DRAWINGS

Embodiments of a downhole apparatus and components thereof according to the disclosures herein are described with reference to the following figures. The same numbers are used throughout the figures to reference like features and components.

FIG. 6 shows a schematic block diagram of a formation-parameter evaluation system according to embodiments of the disclosure;

FIG. 7 shows one example of coordinate system in a cross-dipole acquisition according to embodiments of the disclosure;

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The signal processing systems herein may be incorporated in tool systems such as wireline logging tools, measurement-while-drilling and logging-while-drilling tools, permanent monitoring systems, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Various embodiments incorporating the methods and techniques of this disclosure follow an integrated approach using conventional sonic, ultrasonic and borehole seismic to enable various kinds of measurements such as an evaluation of cement in a wellbore.

Figure 1:
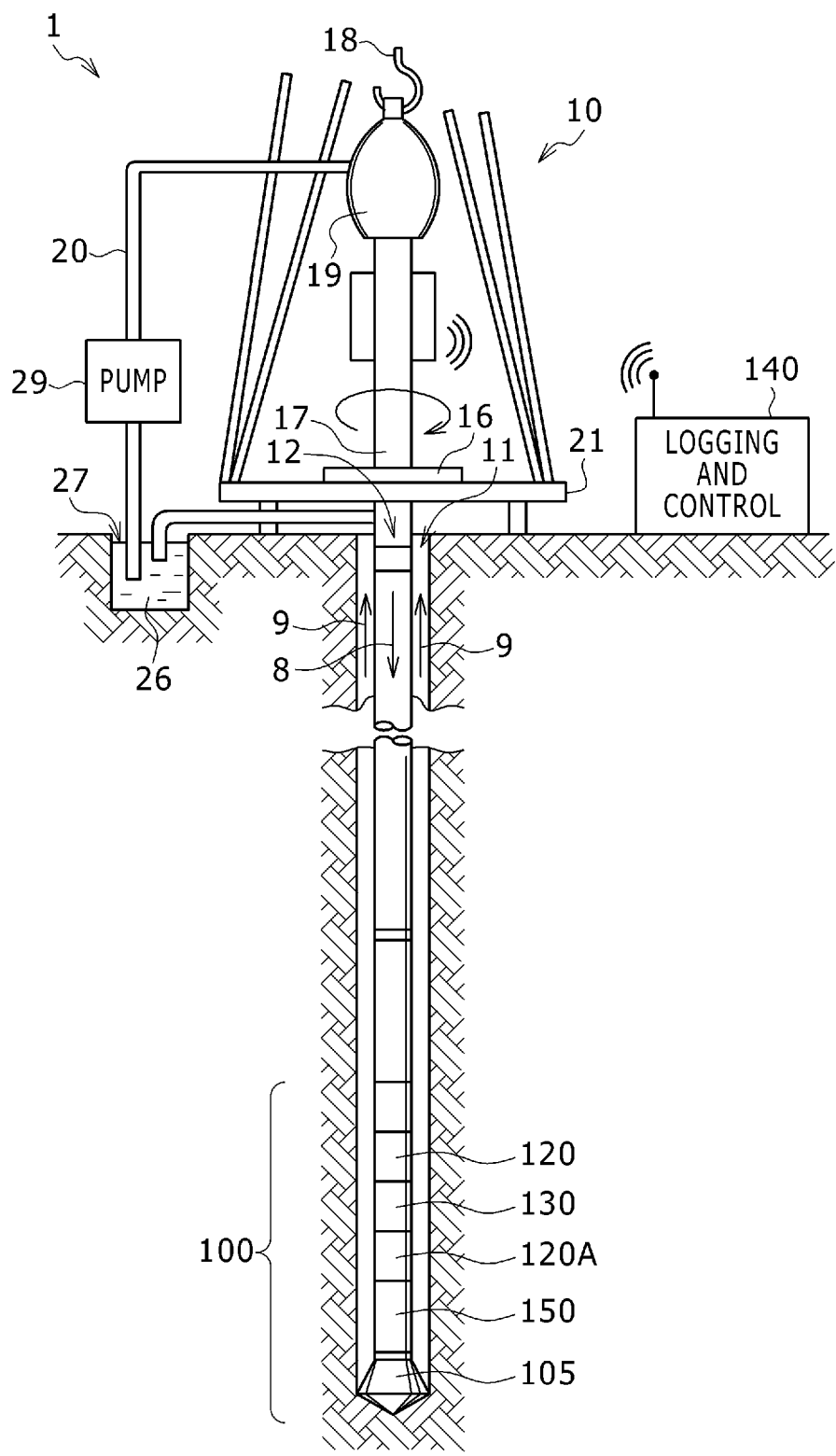
FIG. 1 is a schematic illustration of a wellsite system shown with a number of optional implementations according to embodiments of the disclosure.

Turning to the figures, FIG. 1 illustrates an example wellsite system 1 in which the example methods, apparatus and articles of manufacture described herein to perform sonic data processing can be employed. The wellsite can be onshore or offshore. In this example system, a borehole 11 is formed in subsurface formations by rotary drilling, whereas other example systems can use directional drilling.

A drillstring 12 is suspended within the borehole 11 and has a bottom hole assembly 100 that includes a drill bit 105 at its lower end. The surface system includes platform and derrick assembly 10 positioned over the borehole 11, the assembly 10 including a rotary table 16, kelly 17, hook 18 and rotary swivel 19. In an example, the drill string 12 is suspended from a lifting gear (not shown) via the hook 18, with the lifting gear being coupled to a mast (not shown) rising above the surface. An example lifting gear includes a crown block whose axis is affixed to the top of the mast, a vertically traveling block to which the hook 18 is attached, and a cable passing through the crown block and the vertically traveling block. In such an example, one end of the cable is affixed to an anchor point, whereas the other end is affixed to a winch to raise and lower the hook 18 and the drillstring 12 coupled thereto. The drillstring 12 is formed of drill pipes screwed one to another.

The drillstring 12 may be raised and lowered by turning the lifting gear with the winch. In some scenarios, drill pipe raising and lowering operations require the drillstring 12 to be unhooked temporarily from the lifting gear. In such scenarios, the drillstring 12 can be supported by blocking it with wedges in a conical recess of the rotary table 16, which is mounted on a platform 21 through which the drillstring 12 passes.

In the illustrated example, the drillstring 12 is rotated by the rotary table 16, energized by means not shown, which engages the kelly 17 at the upper end of the drillstring 12. The drillstring 12 is suspended from the hook 18, attached to a traveling block (also not shown), through the kelly 17 and the rotary swivel 19, which permits rotation of the drillstring 12 relative to the hook 18. A top drive system could be used.

In the illustrated example, the surface system further includes drilling fluid or mud 26 stored in a pit 27 formed at the well site. A pump 29 delivers the drilling fluid 26 to the interior of the drillstring 12 via a hose 20 coupled to a port in the swivel 19, causing the drilling fluid to flow downwardly through the drillstring 12 as indicated by the directional arrow 8. The drilling fluid exits the drillstring 12 via ports in the drill bit 105, and then circulates upwardly through the annulus region between the outside of the drillstring and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 includes one or more specially-made drill collars near the drill bit 105. Each such drill collar has one or more logging devices mounted on or in it, thereby allowing downhole drilling conditions and/or various characteristic properties of the geological formation (e.g., such as layers of rock or other material) intersected by the borehole 11 to be measured as the borehole 11 is deepened. In particular, the bottom hole assembly 100 of the illustrated example system 1 includes a logging-while-drilling (LWD) module 120, a measuring-while-drilling (MWD) module 130, a roto-steerable system and motor 150, and the drill bit 105.

The LWD module 120 is housed in a drill collar and can contain one or a plurality of logging tools. It will also be understood that more than one LWD and/or MWD module can be employed, e.g. as represented at 120A. (References, throughout, to a module at the position of 120 can mean a module at the position of 120A as well.) The LWD module 120 includes capabilities for measuring, processing, and storing information, as well as for communicating with the surface equipment. In another example implementation, the LWD module 120 includes a sonic measuring device, an example of which is illustrated in FIG. 2 and described in greater detail below.

The MWD module 130 is also housed in a drill collar and can contain one or more devices for measuring characteristics of the drillstring 12 and drill bit 105. The MWD module 130 further includes an apparatus (not shown) for generating electrical power to the downhole system. This may include a mud turbine generator powered by the flow of the drilling fluid, it being understood that other power and/or battery systems may be employed. In the illustrated example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

The wellsite system 1 also includes a logging and control unit 140 communicably coupled in any appropriate manner to the LWD module 120/120A and the MWD module 130. In the illustrated example, the logging and control unit 140 implements an example slowness filter processing system to process waveforms corresponding to propagating signals in a formation in accordance with the example methods, apparatus and articles of manufacture disclosed herein.

Figure 2:
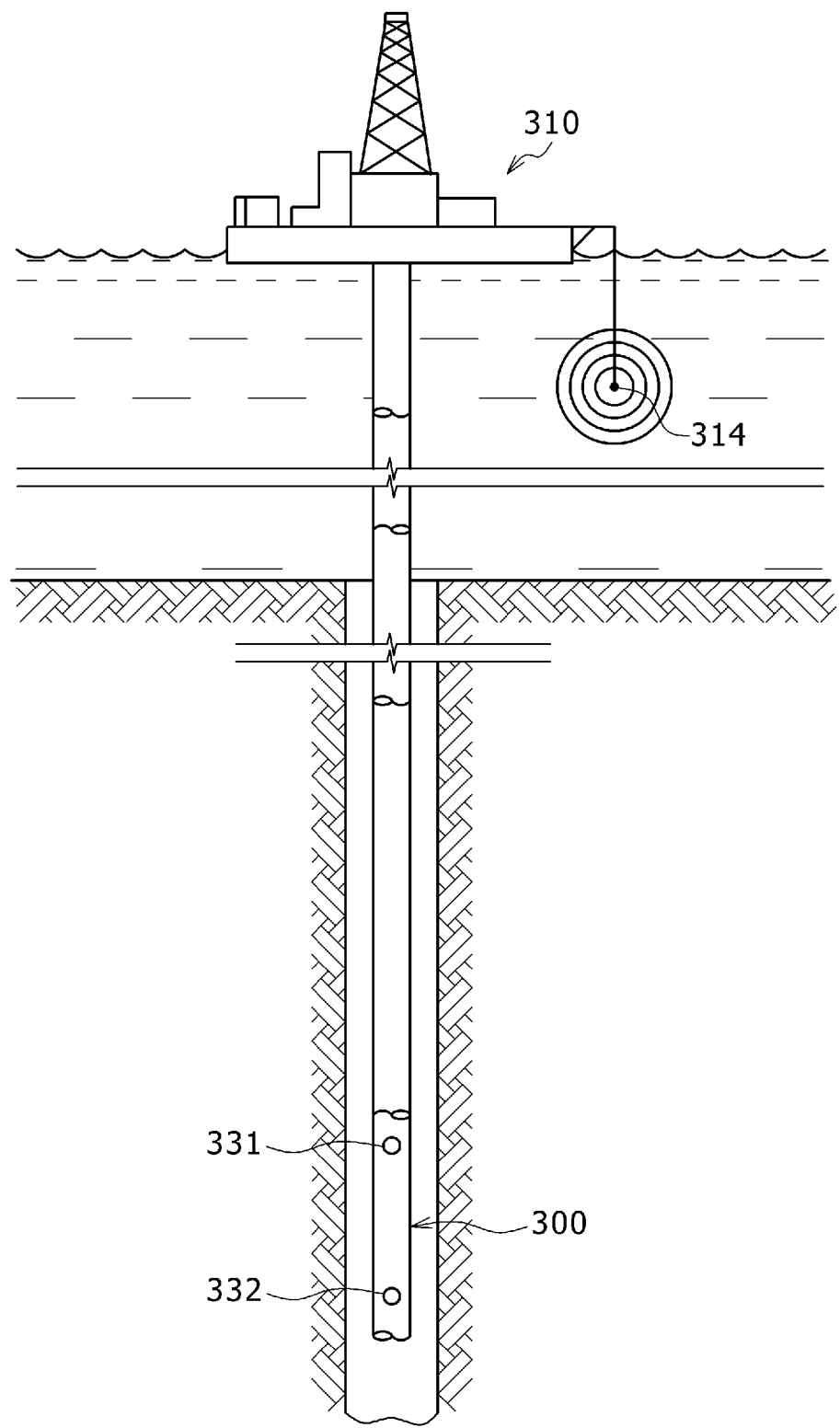
FIG. 2 illustrates one example of a sonic logging-while-drilling tool according to the disclosure herein.

FIG. 2 illustrates a sonic logging-while-drilling tool that can be the LWD tool 120, or can be a part of an LWD tool suite 120A of the type described in U.S. Pat. No. 6,308,137, incorporated herein by reference. In the illustrated example of FIG. 2, an offshore rig 310 is employed, and a sonic transmitting source or array 314 is deployed near the surface of the water. Any other suitable type of uphole or downhole source or transmitter can also be provided. An uphole processor controls the firing of the transmitter 314.

The uphole equipment can also include acoustic receivers and a recorder for capturing reference signals near the source. The uphole equipment further includes telemetry equipment for receiving MWD signals from the downhole equipment. The telemetry equipment and the recorder are coupled to a processor so that recordings may be synchronized using uphole and downhole clocks. A downhole LWD module 300 includes at least acoustic receivers 331 and 332, which are coupled to a signal processor so that recordings may be made of signals detected by the receivers in synchronization with the firing of the signal source.

Figure 3:
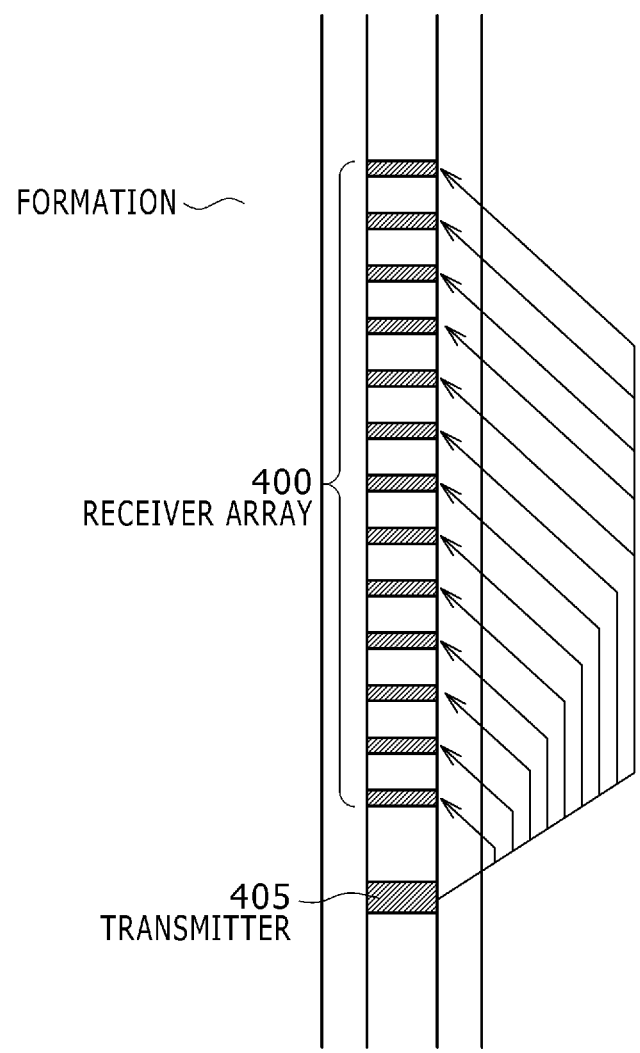
FIG. 3 illustrates one example of receiver array according to the disclosure herein.

An example receiver array 400 that may be included in the example LWD tool 120 and/or 120A of FIGS. 1 and/or 2 is illustrated in FIG. 3. The receiver array 400 of the illustrated example includes an array of thirteen (13) acoustic receivers. However, more or fewer receivers could be included in the receiver array 400. In the illustrated example, each receiver in the receiver array 400 is configured to detect acoustic waves generated by one or more acoustic sources 405 and that propagate in a formation penetrated by a borehole in which the receiver array 400 is placed.

The acoustic waveforms detected by the receivers of the receiver array 400 are staggered in time due to the spacing between the receivers. Signals detected (or sensed) by the receiver array 400 can be non-dispersive or dispersive. For non-dispersive waveforms, the waveforms determined by each receiver are substantially similar except for a time delay. For dispersive waveforms, the waveforms determined by each receiver may appear different. Examples of acoustic waveforms detected by the receiver array 400 are depicted in FIG. 4.

Figure 4:
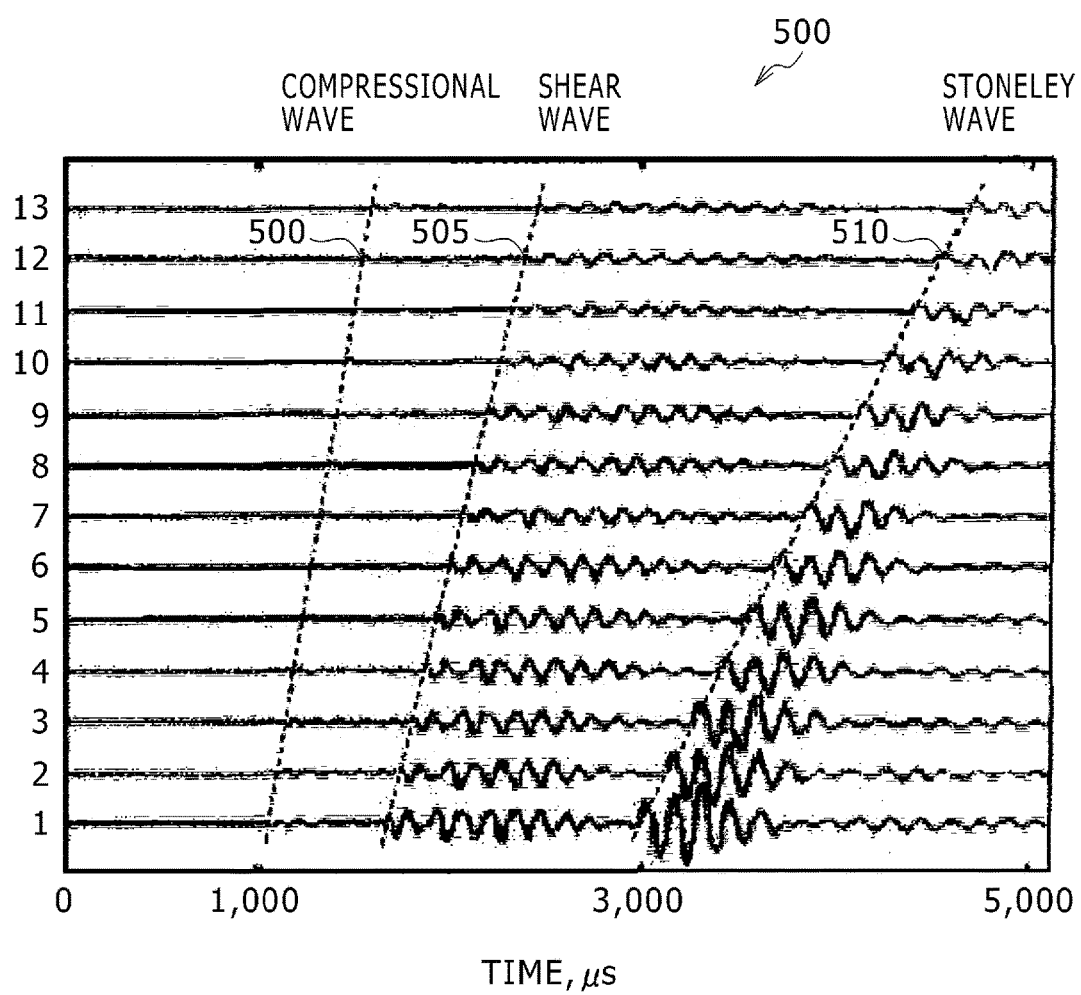
FIG. 4 depicts examples of acoustic waveforms received with the receivers according to the disclosure herein.

FIG. 4 depicts thirteen (13) example acoustic waveforms 500 corresponding respectively to the receivers included in the receiver array 400 of FIG. 3. The acoustic waveforms illustrated in FIG. 4 are offset in time relative to each other due to the spacing between the receivers in the receiver array 400. In the illustrated example, the acoustic waveforms include multiple waveform components, such a compressional waves 505, shear waves 510, Stoneley waves 515, etc.

Figure 5:
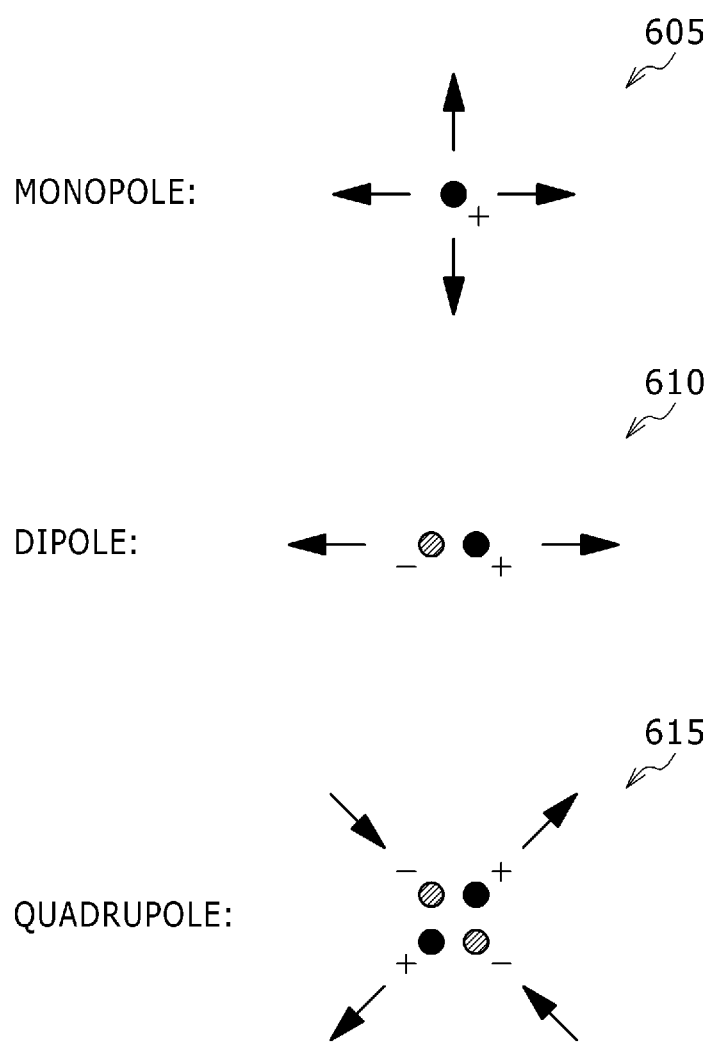
FIG. 5 illustrates examples of transducer modes of the acoustic source (transmitter) according to the disclosure herein.

FIG. 5 illustrates example transducer modes that can be employed by a transmitter, such as the transmitter 405 of FIG. 3. The three types of excitation illustrated in FIG. 5 are monopole excitation, dipole excitation and quadrupole excitation. In the case of monopole excitation, the transmitter can be modeled as a point source 605 that excites a wave that is in phase in all directions. In the case of dipole excitation, the transmitter can be modeled as two-point source 610 whose components vibrate in opposition. The resulting pressure field can be viewed as pushing on one side (corresponding to a positive direction), while pulling down on the other side (corresponding to a negative direction).

The result is a directional excitation that generates directional flexural waves (hereinafter referred to also as "borehole flexural mode") in a formation around a borehole. The borehole flexural modes are dispersive, that is, their velocity varies with frequency, and travel at velocity of shear waves through the formation at low frequencies. In the case of quadrupole excitation, the transmitter can be modeled as a four-point source 615, of which two points located on the same diagonal are in phase, and the two on the other diagonal are out of phase. The quadrupole excitation generates complex quadrupole waves that are frequency dependent.

Wireline logging employs an electrical cable to lower tools into the borehole and to transmit the data. In wireline logging applications, logging can be performed as the tool is pulled out of the borehole. The data is converted downhole into electronic data, which is later transformed into a well log that can be analyzed, provided to a client, etc. Logging while drilling (LWD), is another logging sonic logging technique. Unlike wireline logging in which sensors are lowered into the well at the end of wireline cable, in LWD sensors are integrated into the drill string and the measurements are made while the well is being drilled. Thus, while wireline well logging occurs after the drill string is removed from the well, LWD measures geological parameters while the well is being drilled.

Referring to FIG. 6, the system 700 to acquire dipole wave data measured by a dipole acquisition in multiple firing and evaluate formation anisotropy properties based on the multiple firing dipole data may comprise a data logging system 702, acoustic receivers (vibration sensors) 704 located in the wellbore, an acoustic source 706 of generating vibrations to be received with the receivers 704, a data processor 710 such as a computer apparatus, and a memory 720. For example, the data logging system 702 may comprise one or more modules in the foregoing tool and tubing/cable.

The receivers 704 such as the downhole array of multiple receivers or the DVS (Distributed Sensing System) may be installed in the foregoing tool and coupled with the data logging system 702 via the tubing/cable. The acoustic source 706 such as the foregoing one or more sources may be coupled with the data logging system 702 so that the generation of vibrations can be controlled. The acoustic waves detected with the receivers 704 may be transmitted to the data logging system 702 via the tubing/cable and the data logging system 702 may produce a data log of acoustic waves (vibrations) received at the receivers 704. The data processor 710 may be coupled with the data logging system 702 via a cable or a network so as to be received the data log from the data logging system 702. The data processor 710 may be implemented by one or more circuit(s), programmable processor(s), application specific integrated circuit(s) (ASIC(s)), programmable logic device(s) (PLD(s)) and/or field programmable logic device(s) (FPLD(s)), etc.

The data log may be transferred from the data logging system 702 to the data processor 710 via a storage medium such as a USB memory, a memory card, a magnetic tape or disk, an optical disk, etc. The data processor 710 may be also installed within the data logging system 702. The sonic data such as waveforms are temporarily or permanently stored in the memory 720 which is a tangible computer readable medium such as a memory, digital versatile disk (DVD), compact disk (CD), etc. Software and/or firmware including instructions for processing the sonic data are also stored in the memory. The data processor 710 and the memory 720 may be configured with the processing system 1200 of FIG. 20, which is described in greater detail below.

In embodiments of the present disclosure, anisotropic properties (for example, fast shear direction, fast shear slowness and slow shear slowness) of subterranean formation are estimated from acoustic measurements by a downhole sonic tool such as an LWD tool. In some embodiments of the disclosure, the method includes (1) Alford rotation processing while drilling for multiple firing dipole data in cross-dipole acquisition or single-dipole acquisition; (2) Alford rotation processing while drilling with orthogonality error angle inversion; (3) quality control of Alford Rotation results while drilling in the pump-off period. The method utilizes the advantages of LWD logging that the measurements are performed while the tool is rotating and naturally we can have multi-azimuth data. The disclosed method may be also applied to Wireline cross dipole data in case the two dipole firing are not orthogonal by any reason, i.e. rapid tool rotation.

1. Alford Rotation Processing While Drilling for Multiple Firing Dipole Data While Drilling:

In some embodiments of the disclosure, the following 2 cases, (1-1) and (1-2) are considered for acquiring sonic data from the downhole tool.

Figure 8:
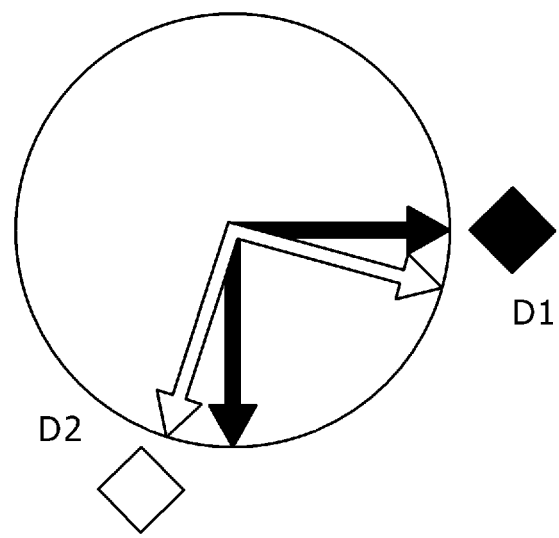
FIG. 8 shows a schematic illustration of two dipole firings D1 and D2 in a cross-dipole acquisition according to embodiments of the disclosure.

(1-1) Cross-dipole acquisition: Referring to FIGS. 7 and 8 for this case, xx (in-line) and xy (cross-line) with D1 dipole firing and yy (in-line) and y x(cross-line) with D2 dipole firing where D and D2 are not necessarily orthogonal. When D1 dipole firing is performed, the tool is in x-y position and when D2 dipole firing is performed, the tool is rotated by $\theta$ then in $x_\theta$-$y_\theta$ position, where the angle $\theta$ is assumed to be known from measurement. The rotation can be expressed by the following Equation (1).

$$\begin{bmatrix} xx_\theta(t) & yx_\theta(t) \\ xy_\theta(t) & yy_\theta(t) \end{bmatrix} = R(\theta) \begin{bmatrix} xx(t) & yx(t) \\ xy(t) & yy(t) \end{bmatrix} R^T(\theta) \quad (1)$$

$$R(\theta) = \begin{bmatrix} \cos\theta & \sin\theta \\ -\sin\theta & \cos\theta \end{bmatrix}$$

For xx, xy, $yy_\theta$ and $yx_\theta$, because y and $y_\theta$ are not aligned, it is not possible to apply Alford Rotation. However, Alford Rotation can be applied using the following relation to compensate tool rotation.

$$yy_\theta = yy^*\cos^2\theta + xx^*\sin^2\theta + (xy+yx_\theta)^*\sin\theta\cos\theta$$

$$yx_\theta = yx^*\cos^2\theta - xy^*\sin^2\theta + (xx-yy_\theta)^*\sin\theta\cos\theta \quad (2)$$

Then (yy) (in-line) and (yx) (cross-line), which would be measured when the tool is x-y position, can be expressed as follows:

$$yy = yy_\theta - (xy + yx_\theta)\tan\theta$$

$$yx = yx_\theta(xx - yy_\theta)\tan\theta \quad (3)$$

Equation 3 indicates the measurement is in a better condition (close to Alford geometry) when $\theta$ is small.

From xx, xy, yx, and yy, Alford Rotation processing can be applied. Here, considering stacking cross-energy computation results with multiple firing of D1 and D2 waveforms in a certain interval, then the results can be combined in cross-energy minimization as expressed by the following Equation 4. The firing pairs of good configuration can be selected.

$$a = \sum_s \sum_t \{xy^2 + yx^2\} \quad (4)$$

$$b = \sum_s \sum_t \{[xx - yy]^2 - [xy + yx]^2\}$$

$$c = \sum_s \sum_t \{[xx - yy][xy + yx]\}$$

Here $$\sum_s$$

is summation over different set of firing in the interval and $$\sum_t$$

is summation over time indices. Minimization angle is:

$$\theta_0 = \frac{1}{4}\text{atan}\frac{2c}{b} + \frac{\pi}{4}\frac{(|b|-b)}{2b} \quad (5)$$

Minimum (MinEne) and maximum (MaxEne) cross energies are obtained as follows:

$$\text{MinEne} = a + \frac{b}{2}(\sin 2\theta_0)^2 - \frac{c}{2}\sin 4\theta_0 \quad (6)$$

$$\text{MaxEne} = a + \frac{b}{2}(1 - (\sin 2\theta_0)^2) + \frac{c}{2}\sin 4\theta_0$$

Rotated waveforms can be obtained from standard Alford Rotation equation (Equation 1). Velocity analysis can be applied to obtain fast and slow shear slowness.

Figure 9:
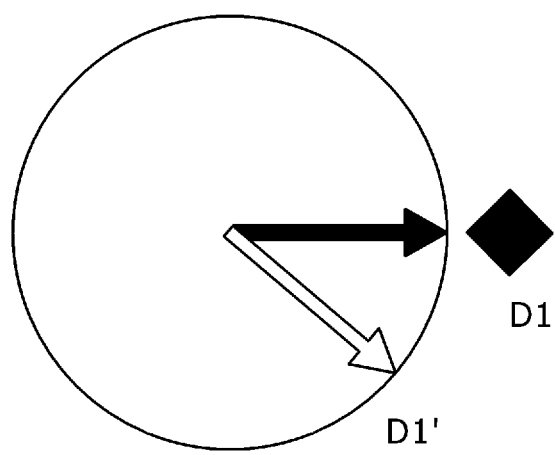
FIG. 9 shows a schematic illustration of two dipole firings D1 and D1' in a single-dipole acquisition according to embodiments of the disclosure.

(1-2) Single-dipole acquisition: In this case, xx (in-line) and xy (cross-line) with D1 dipole firing and xx (in-line) and xy (cross-line) with D1 dipole firing where 2 dipole firing direction differs by tool rotation. Referring to FIG. 9, when D1 dipole firing is performed, the tool is in x-y position and when another D1' dipole firing is performed, the tool is rotated by $\theta$ then in $x_\theta$- $y_\theta$ position, where the angle $\theta$ is assumed to be known from measurement.

For xx, xy, $yy_\theta$ and $yx_\theta$, it is not possible to apply Alford Rotation. However, as in the foregoing case (1-1), the following equation can be derived from Equation 1 to compensate the tool rotation.

$$xx_\theta = xx \cos^2\theta + yy \sin^2\theta + (xy_\theta + yx)\sin\theta\cos\theta$$

$$xy_\theta = yx \cdot \sin^2\eta + xy \cos^2\theta - (xx_\theta - yy)\sin\theta\cos\theta \quad (7)$$

yy and yx when the tool is in x-y position are derived as follows:

$$yy = xx_\theta - (xy + xy_\theta)\cot\theta$$

$$yx = -xy_\theta - (xx - xx_\theta)\cot\theta$$

Contrary to (1-1) case, Equation 8 indicates the measurement is better condition (close to Alford geometry) when $\theta$ is close to 90 degrees. Then 4 sets of waveforms can be obtained. Here cross-energy computation results from multiple firing can be also stacked in a certain depth interval. The firing pairs of good configuration can be selected. Rest of the processing can be performed as the same way as the foregoing case (1-1).

Figure 19:
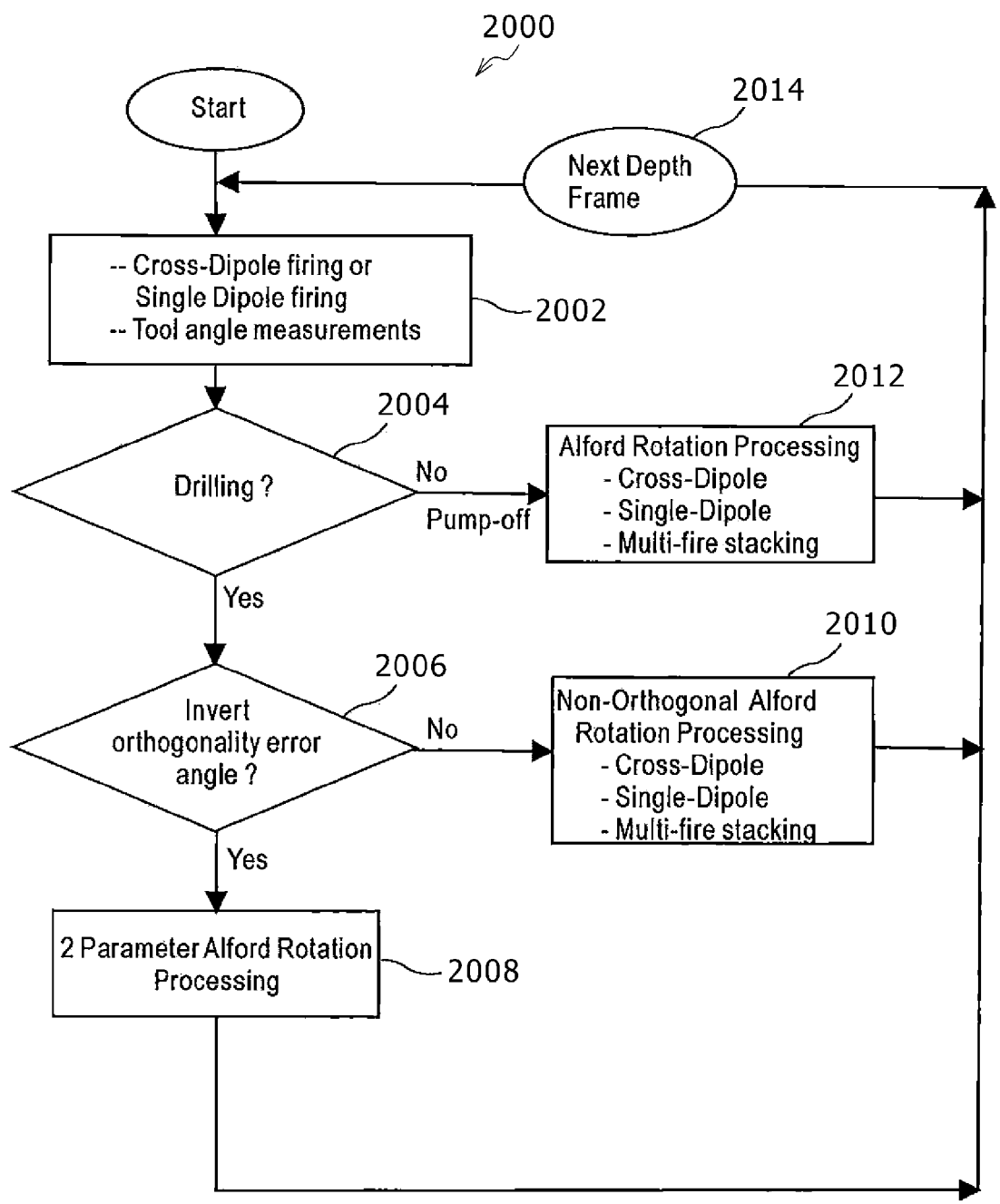
FIG. 19 is a flowchart showing one examples of data processing according to the disclosure herein.

2. Alford Rotation Processing While Drilling with Orthogonality Error Angle Inversion:

In this case, the orthogonality error angle $\gamma$ is inverted simultaneously with the anisotropy direction $\theta$ by 2 parameter Alford Rotation, as shown in FIG. 19 below.

Figure 10:
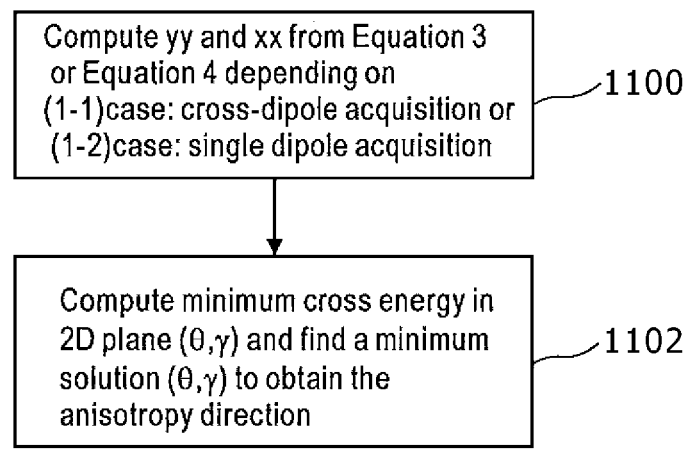
FIG. 10 is a flowchart showing one example of Alford rotation processing while drilling with orthogonality error angle inversion according to the disclosure herein.
Figure 11:
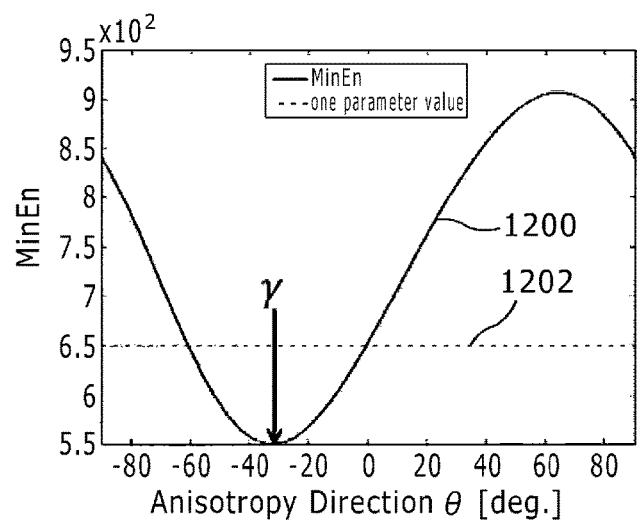
FIG. 11 shows one example of result of Alford rotation processing while drilling with orthogonality error angle inversion according to the disclosure herein.

As shown in FIGS. 10 and 11, the workflow Alford rotation processing while drilling with orthogonality error angle may include two steps. At step 1100 in FIG. 10, during logging, yy and xx from Equation 3 or Equation 4 depending on the (1-1) case: cross-dipole acquisition or (1-2) case: single dipole acquisition are computed. Then, at step 1102 in FIG. 10, minimum cross energy in 2D plane (θ, γ) (see FIG. 11), and find a minimum solution (θ, γ) to obtain the anisotropy direction θ.

Figure 12:
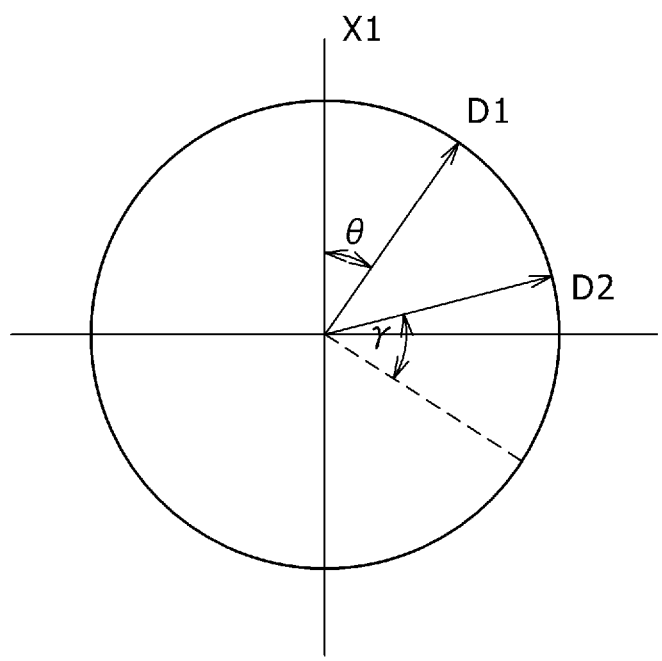
FIG. 12 shows one example of coordinate system for evaluating the workflow of 2D Alford rotation according to embodiments of the disclosure.

In order to evaluate this workflow using 2D Alford Rotation, testing with model data is performed. Here D1 and D2 are 2 dipole firing, which are not necessarily orthogonal as shown in FIG. 12. Anisotropy direction is θ and the orthogonality error angle is γ.

Modeling data in horizontal well condition is generated with the following parameters, where DTc is slowness of compressional velocity, DTs is slowness of shear velocity, DTm is mud slowness and Rhom is mud density.

Borehole Diameter: 6.5 in
Tool Inner Diameter/Tool Outer Diameter: 2.3 in/4.82 in
Transmitter to 1st Receiver/Receiver to Receiver spacing: 7 ft/4 in
DTc/DTs-fast/DTs-slow/Rhob: 65 μs/ft/108 μs/ft /152 μs/ft/2.7 g/cm$^3$
Mud DTm/Rhom: 284 μs/ft/2.04 g/cm$^3$
Modeling cases:
θ=[0074] with step=2 degrees
γ=[0,–88] with step=2 degrees Two-parameter Alford rotation method was applied to 990 cases of D1 and D2 mutual orientations. After that case-to-case and statistical analysis was performed.

Figure 13:
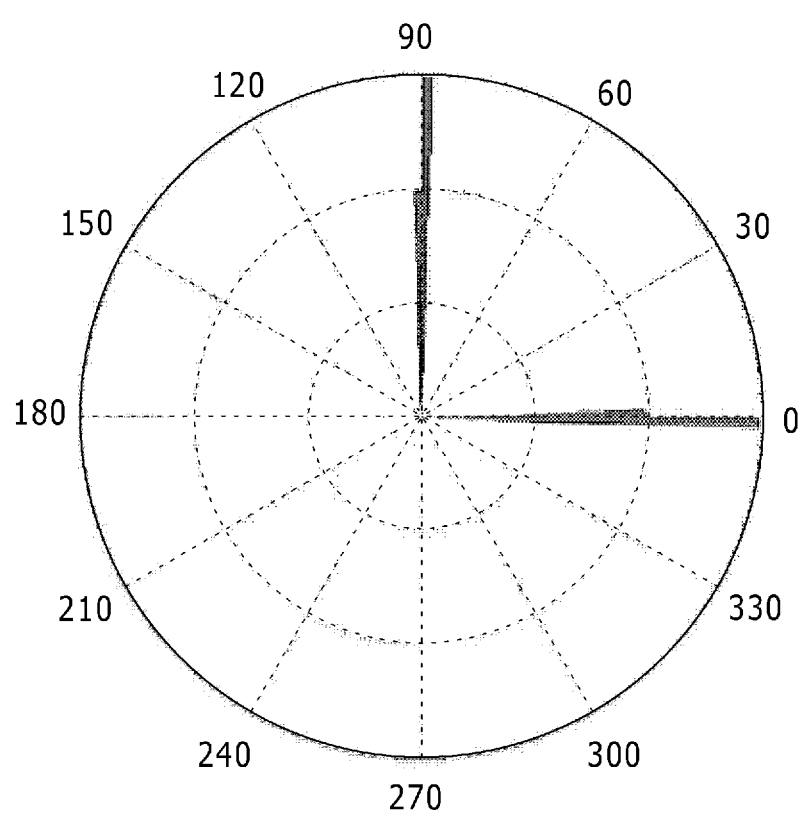
FIG. 13 shows one example of reconstruction of anisotropy direction θ for 990 cases according to embodiments of the disclosure.
Figure 14:
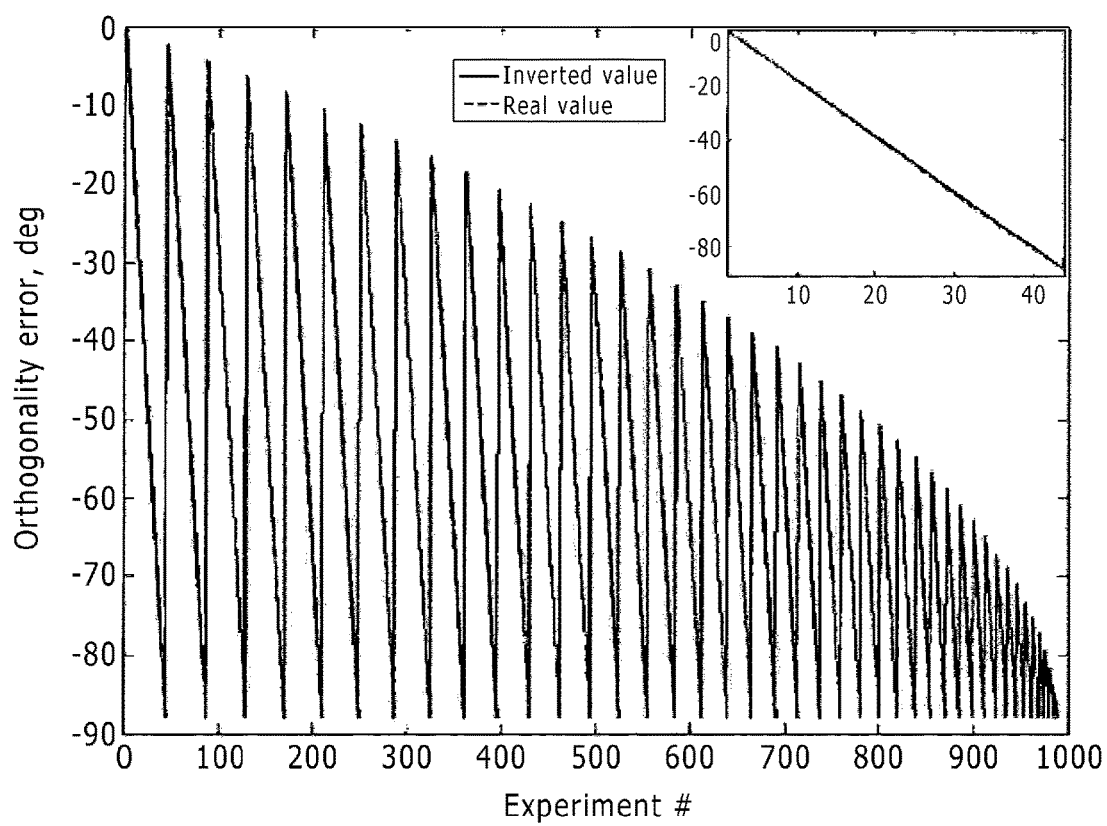
FIG. 14 shows an orthogonality error angle γ for any θ from 0 to 90 degrees and γ from 0 to −90 degrees according to embodiments of the disclosure.
Figure 15:
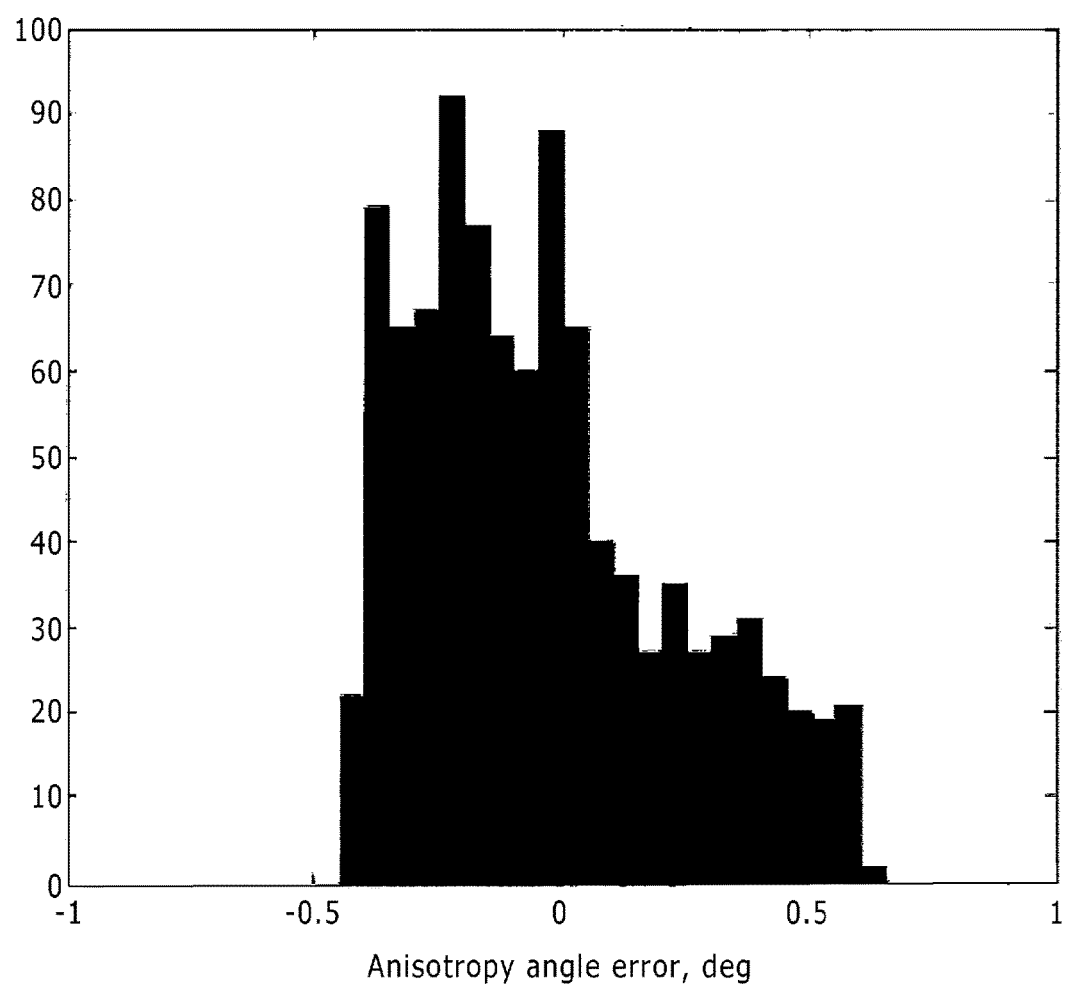
FIG. 15 shows a histogram for θ angle computation error for 990 cases according to embodiments of the disclosure.
Figure 16:
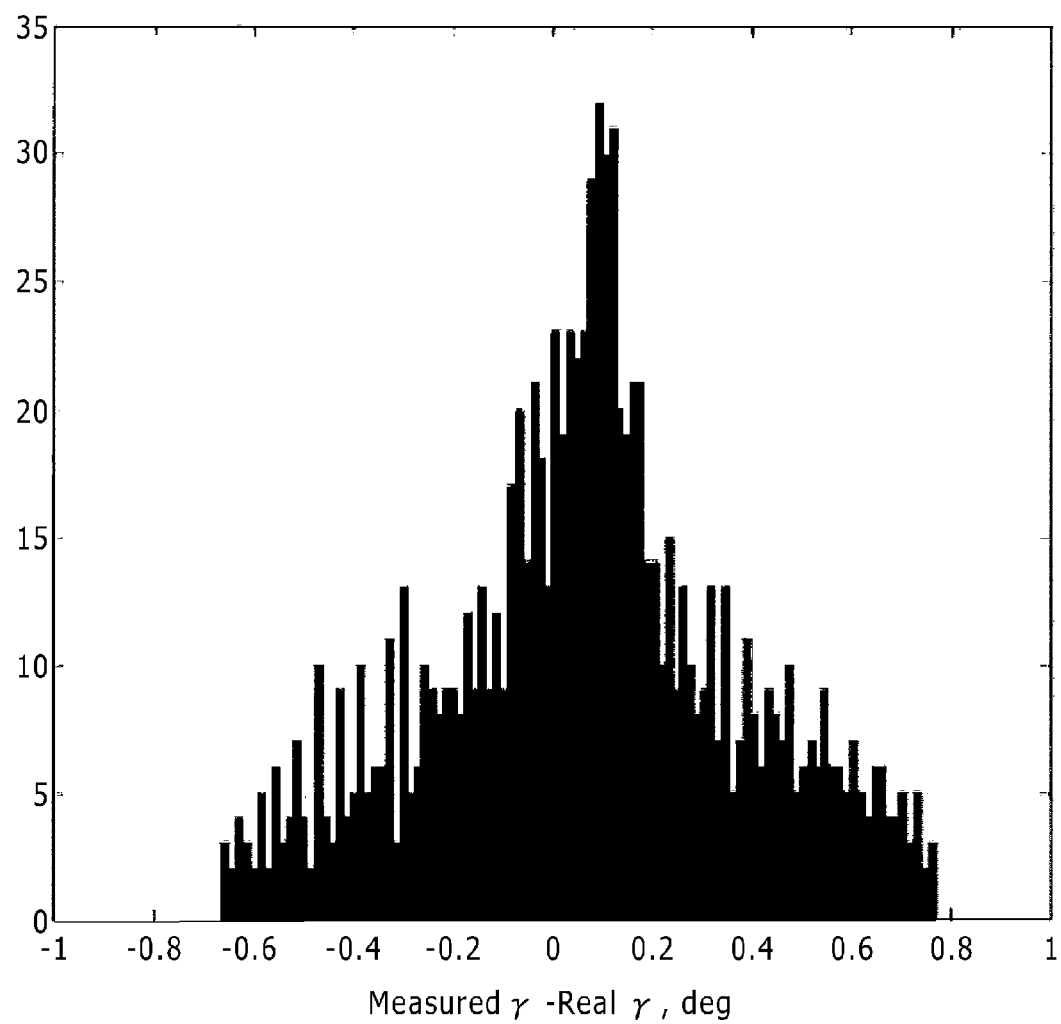
FIG. 16 shows a histogram for γ angle computation error for 990 cases according to embodiments of the disclosure.

FIG. 13 shows reconstruction of anisotropy direction θ for 990 cases, in which angle θ to anisotropy axis is plotted for any θ from 0 to 90 degrees and γ from 0 to –88 degrees. FIG. 14 shows the comparison of γ angle reconstruction with real value for 990 cases, in which orthogonality error angle γ is plotted for any θ from 0 to 90θ degrees and γ from 0 to –90 degrees. FIG. 15 shows histogram analysis of the anisotropy direction θ, in which the maximum observed error do not exceed 0.6 degrees. FIG. 16 shows histogram analysis of orthogonality error angle γ for 990 cases, in which the maximum observed error do not exceed 0.8 degrees. Even 2 degrees D1&D2 inclination is processed accurately. These results show 2D Alford Rotation accurately reconstruct anisotropy direction θ and orthogonality error angle γ.

Figure 17A:
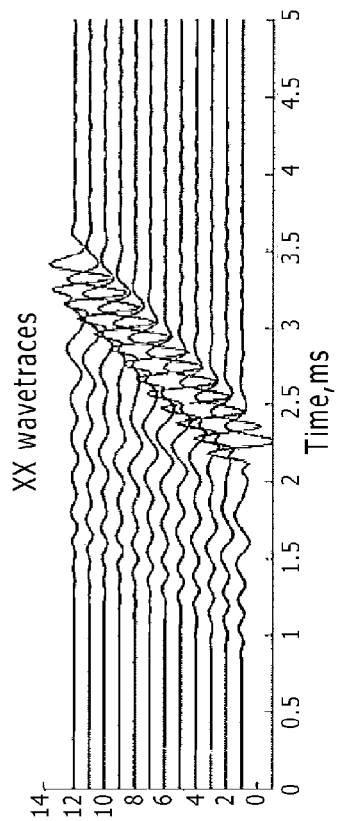
FIGS. 17A and 17B shows, respectively, an example of XX- and YY-component waveforms before and after 2D Alford Rotation according to embodiments of the disclosure.
Figure 17B:
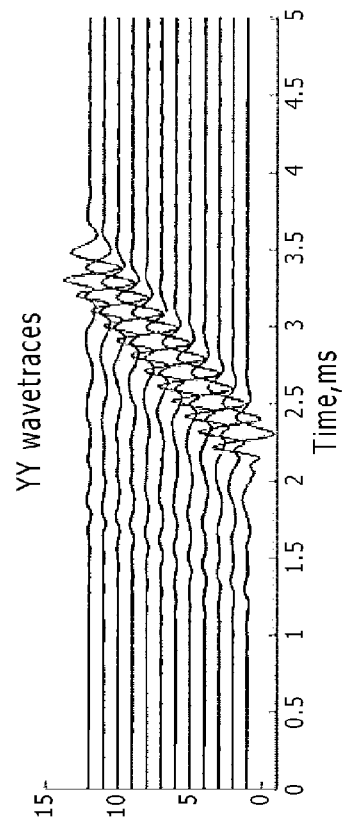

FIGS. 17A and 17B shows, respectively, an example of XX- and YY-component waveforms before and after 2D Alford Rotation. In this example, the anisotropy direction θ is 26.59 degrees and the orthogonality error angle γ is –36.82 degrees. 2D Alford Rotation gives θ=26.79 degrees and γ=–36.86 degrees.

Figure 18A:
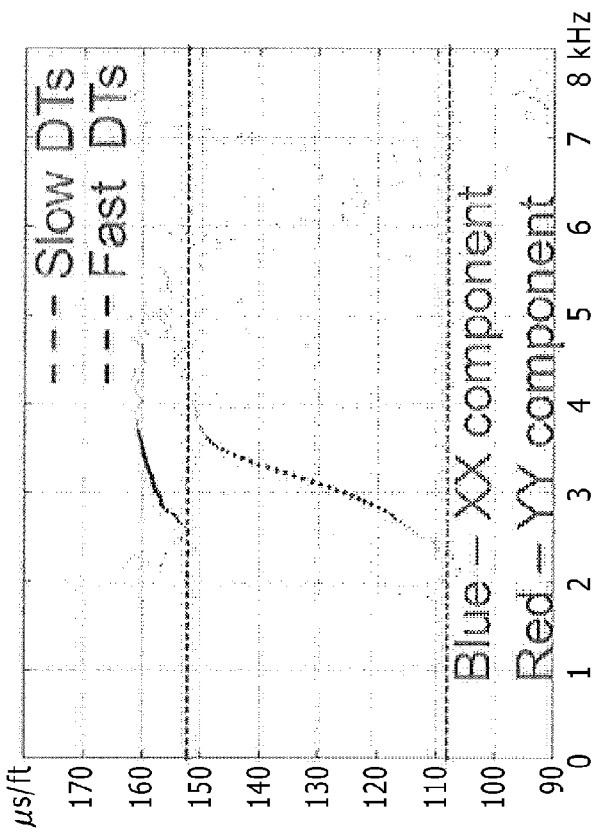
FIGS. 18A and 18B shows, respectively, dispersion analysis results of XX- and YY-component waveforms before and after 2D Alford Rotation according to embodiments of the disclosure.
Figure 18B:
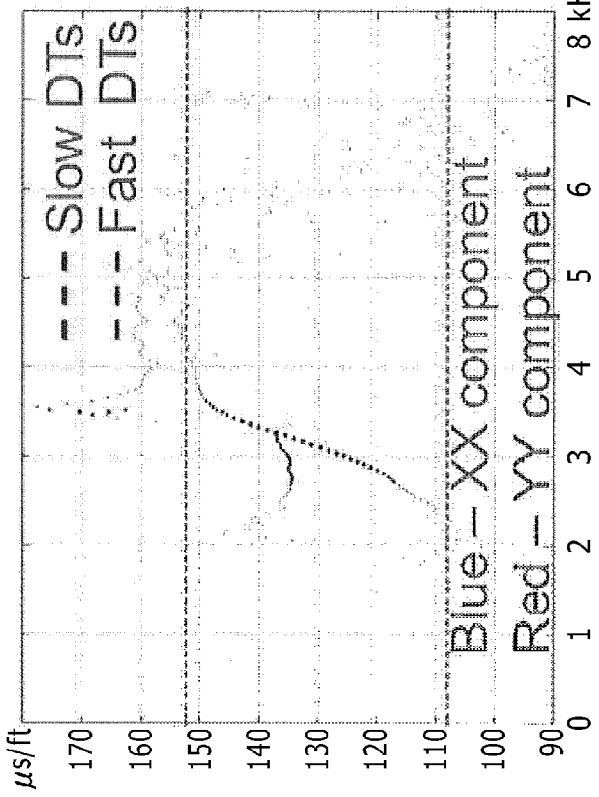

FIGS. 18A and 18B shows, respectively, dispersion analysis results of XX- and YY-component waveforms before and after 2D Alford Rotation. The dispersion after 2D Alford Rotation is consistent with fast and slow shear slowness.

3. Quality Control of Alford Rotation Processing Results in the Pump-Off Period:

In the pump-off period, high-quality quiet data can be acquired with exact Alford Rotation geometry. Therefore, using high-quality quiet data acquired in the pump-off period, Alford rotation processing results can be checked and a quality-control of Alford rotation results can be performed while drilling at a pipe-connection time.

FIG. 19 is a flowchart 2000 showing one examples of data processing for dipole anisotropy in the disclosure. This flowchart 2000 shows an embodiment of the processing for a LWD tool. At step 2 in FIG. 19, sonic measurements and tool angle measurements are performed under cross-dipole firing or single-dipole firing by a LWD tool in a borehole. When drilling (YES at step 2004) and an orthogonality error angle of the firing data is inverted in two dipole firings (YES at step 2006), the 2 parameter Alford Rotation processing is performed at step 2008. If an orthogonality error angle of the firing data is not inverted (NO at step 2006), the non-orthogonal Alford Rotation processing is performed at step 2010. When not drilling in a pump-off period (NO at step 2004), the standard Alford Rotation processing is performed at step 2012. The steps from 2002 to 2012 are repeated each depth frame in a predetermined depth range of the borehole via step 2014.

Figure 20:
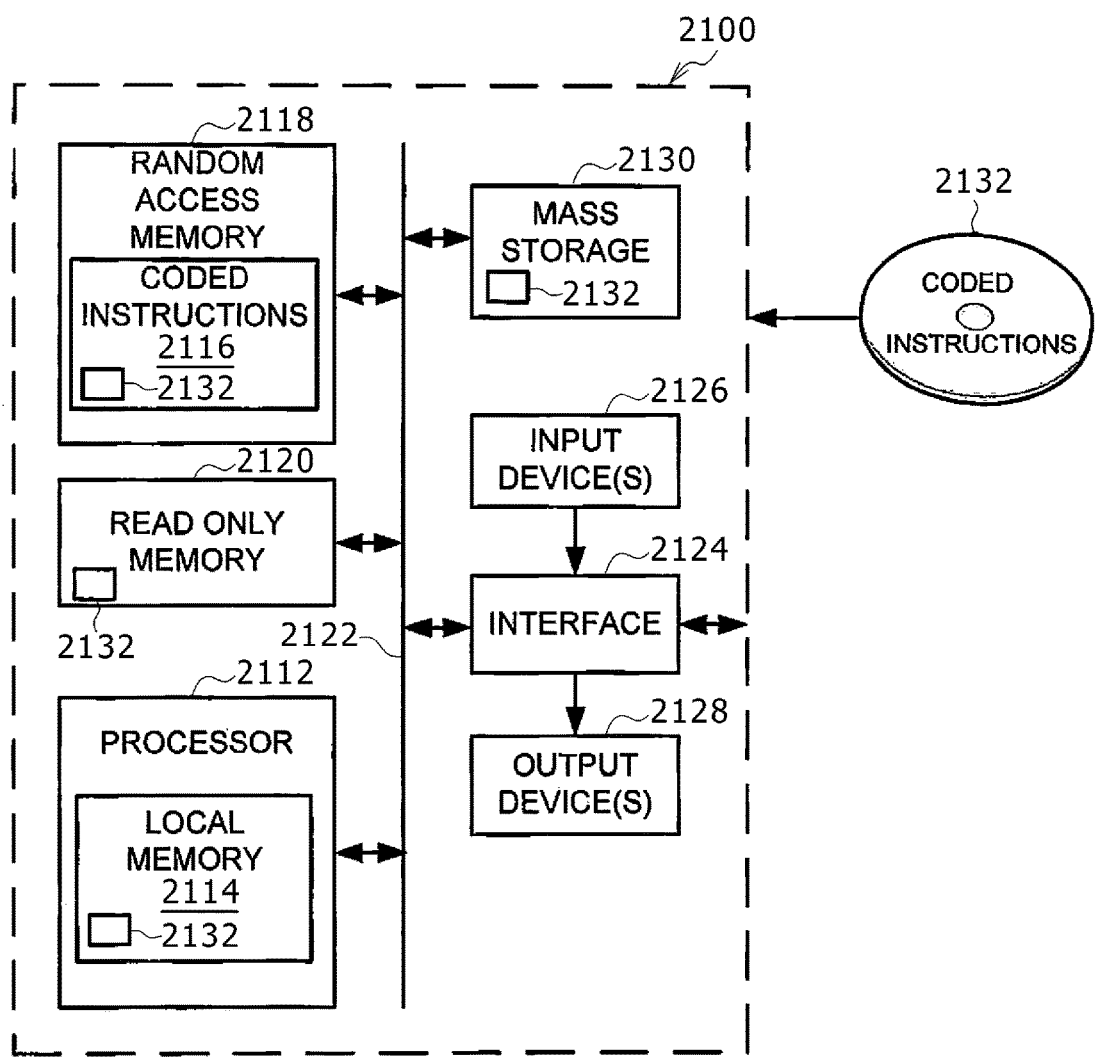
FIG. 20 is a block diagram of an example processing system that may execute example machine readable instructions used to implement some or all of the processes of FIGS. 7-19 to implement the example data processor of FIG. 6.

FIG. 20 is a block diagram of an example processing system 2100 capable of implementing the apparatus and methods disclosed herein. The processing system 2100 can be, for example, a server, a personal computer, a personal digital assistant (PDA), a smartphone, an Internet appliance, etc., or any other type of computing device.

The system 2100 of the instant example includes a processor 2112 such as a general purpose programmable processor. The processor 2112 includes a local memory 2114, and executes coded instructions 2116 present in the local memory 2114 and/or in another memory device. The processor 2112 may execute, among other things, machine-readable instructions to implement the processes represented in FIGS. 7-19. The processor 2112 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 2112 is in communication with a main memory including a volatile memory 2118 and a non-volatile memory 2120 via a bus 2122. The volatile memory 2118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2120 may be implemented by flash memory and/or any other desired type of memory device. Access to the main memory 2118, 2120 is controlled by a memory controller (not shown).

The processing system 2100 also includes an interface circuit 2124. The interface circuit 2124 may be implemented by any type of interface standard, such as an Ethernet interface, a universal serial bus (USB), and/or a third generation input/output (3GIO) interface.

One or more input devices 2126 are connected to the interface circuit 2124. The input device(s) 2126 permit a user to enter data and commands into the processor 2112. The input device(s) can be implemented by, for example, a keyboard, a mouse, a touchscreen, a track-pad, a trackball, an isopoint and/or a voice recognition system.

One or more output devices 2128 are also connected to the interface circuit 2124. The output devices 2128 can be implemented, for example, by display devices (e.g., a liquid crystal display, a cathode ray tube display (CRT)), by a printer and/or by speakers. The interface circuit 2124, thus, includes a graphics driver card.

The interface circuit 2124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 2100 also includes one or more mass storage devices 2130 for storing machine-readable instructions and data. Examples of such mass storage devices 2130 include floppy disk drives, hard drive disks, compact disk drives and digital versatile disk (DVD) drives.

In some examples, the mass storage device 2130 may store the set of input waveforms 708. In some examples the volatile memory 2118 may store the set of input waveforms 708.

The coded instructions 2132 for data processing in FIGS. 7-19 may be stored in the mass storage device 2130, in the volatile memory 2118, in the non-volatile memory 2120, in the local memory 2114 and/or on a removable storage medium, such as a CD or DVD 2132.

As an alternative to implementing the methods and/or apparatus described herein in a system such as the processing system of FIG. 20, the methods and or apparatus described herein may be embedded in a structure such as a processor and/or an ASIC (application specific integrated circuit).

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method for verifying a determination of an anisotropic property of a formation during drilling of the formation, the method comprising:
    accessing first dipole wave data generated during a first dipole firing and a second dipole firing by a downhole tool disposed in the formation, the first dipole wave data generated during the drilling, the first dipole firing non-orthogonal relative to the second dipole firing;
    performing, by executing an instruction with a processor, an inversion of an orthogonality error angle of the first dipole wave data to generate inverted orthogonality error angle data;
    estimating, by executing an instruction with the processor, the anisotropic property of the formation based on the inverted orthogonality error angle data and the first dipole wave data; and
    verifying, by executing an instruction with the processor, the anisotropic property based on second dipole wave data generated during a cessation of the drilling.

2. The method according to claim 1, wherein estimating the anisotropic property is based on Alford rotation processing.

3. The method according to claim 1, wherein the first dipole firing and the second dipole firing comprises one of a cross dipole acquisition or a single dipole acquisition.

4. The method of claim 3, wherein the downhole tool is at a first rotational position during the first dipole firing and a second rotational position during the second dipole firing.

5. The method according to claim 1, wherein the anisotropic property comprises one of or more of a fast shear direction, a fast shear slowness, and a slow shear slowness.

6. The method of claim 1, wherein the cessation in drilling is associated with a pump-off period.

7. The method according to claim 1, wherein the downhole tool includes a LWD (logging-while-drilling) tool.

8. The method according to claim 1, wherein the second dipole wave data includes wireline cross dipole data.

9. A system for verifying a determination of an anisotropic property of a formation during drilling of the formation, the system comprising:
    a memory to record first dipole wave data generated during a first dipole firing and a second dipole firing by a downhole tool disposed in the formation, the first dipole wave data generated during the drilling, the first dipole firing non-orthogonal relative to the second dipole firing; and
    a processor in communication with the memory, the processor to:
        access the first dipole wave data;
        perform an inversion of an orthogonality error angle of the first dipole wave data to generate inverted orthogonality error angle data;
        estimate the anisotropic property of the formation based on the inverted orthogonality error angle data and the first dipole wave data; and
        verify the anisotropic property based on second dipole wave data generated during a cessation of the drilling.

10. The system according to claim 9, wherein the processor is to estimate the anisotropic property based on Alford rotation processing.

11. The system according to claim 9, wherein the first dipole firing and the second dipole firing comprises one of a cross dipole acquisition or a single dipole acquisition.

12. The system of claim 11, wherein the downhole tool is at a first rotational position during the first dipole firing and a second rotational position during the second dipole firing.

13. The system according to claim 9, wherein the anisotropic property comprises one or more of a fast shear direction, a fast shear slowness, or a slow shear slowness.

14. The system of claim 9, wherein the cessation in drilling is associated with a pump-off period.

15. The system according to claim 9, wherein the downhole tool includes a LWD (logging-while-drilling) tool.

16. The system according to claim 9, wherein the second dipole wave data includes wireline cross dipole data.

17. A tangible article of manufacture storing machine readable instructions which, when executed, cause a machine to at least:

access first dipole wave data generated during a first dipole firing and a second dipole firing by a downhole tool disposed in a formation, the first dipole wave data generated during drilling of the formation, the first dipole firing non-orthogonal relative to the second dipole firing;

perform an inversion of an orthogonality error angle of the first dipole wave data to generate inverted orthogonality error angle data;

estimate the anisotropic property of the formation based on the inverted orthogonality error angle data and the first dipole wave data; and verify the anisotropic property based on second dipole wave data generated during a cessation of the drilling.

18. The tangible article of manufacture according to claim 17, wherein the machine readable instructions, when executed, further cause the machine to estimate the anisotropic property based on Alford rotation processing.

19. The tangible article of manufacture according to claim 17, wherein the cessation in drilling is associated with a pump-off period.

\* \* \* \* \*